US012350703B2

(12) United States Patent
Goodwin, Jr. et al.

(10) Patent No.: US 12,350,703 B2
(45) Date of Patent: Jul. 8, 2025

(54) COATINGS ROLLER ASSEMBLY WITH IMPROVED FRAME

(71) Applicant: SWIMC LLC, Cleveland, OH (US)

(72) Inventors: Edward Ray Goodwin, Jr., Westlake, OH (US); Yandong Shen, Guangdong (CN); Michael C. Lambertson, Jr., Aurora, OH (US); Victor J. Levand, Lyndhurst, OH (US)

(73) Assignee: SWIMC LLC, Cleveland, OH (US)

( * ) Notice: Subject to any disclaimer, the term of this patent is extended or adjusted under 35 U.S.C. 154(b) by 49 days.

(21) Appl. No.: 17/781,217

(22) PCT Filed: Dec. 30, 2020

(86) PCT No.: PCT/CN2020/141493
§ 371 (c)(1),
(2) Date: May 31, 2022

(87) PCT Pub. No.: WO2021/136402
PCT Pub. Date: Jul. 8, 2021

(65) Prior Publication Data
US 2023/0001444 A1 Jan. 5, 2023

Related U.S. Application Data

(60) Provisional application No. 62/954,905, filed on Dec. 30, 2019.

(51) Int. Cl.
*B05C 17/02* (2006.01)

(52) U.S. Cl.
CPC ...... *B05C 17/0215* (2013.01); *B05C 17/0205* (2013.01); *Y10T 29/49549* (2015.01)

(58) Field of Classification Search
CPC ...................................................... B05C 17/02
See application file for complete search history.

(56) References Cited

U.S. PATENT DOCUMENTS 4,196,805 A 4/1980 Banno
5,167,055 A 12/1992 Stoddart et al.
(Continued)

FOREIGN PATENT DOCUMENTS

BR 202017010984 U2 * 12/2018 ............ B05C 17/02
CN 107206415 A 9/2017
(Continued)

OTHER PUBLICATIONS

English Machine Translation of BR202017010984U2 (Year: 2018).*
(Continued)

*Primary Examiner* — Sarang Afzali
(74) *Attorney, Agent, or Firm* — Tucker Ellis LLP; Michael G. Craig

(57) ABSTRACT

One or more technique and/or systems for a coating roller assembly, including a coating applicator cage frame and a frame wire. The roller assembly can comprise a handle coupled with the frame wire configured to operably hold the coating applicator cage frame. Bearings can be fixed to the coating applicator cage frame at its both ends. Instead of using typical pinning or swedging techniques for holding the bearing, a sleeve can be crimped into place over a treated surface of the frame wire between the second end and third bend (112). In this way, for example, the structural integrity of the frame wire can be substantially maintained, providing for improved durability and a longer life for the roller assembly.

20 Claims, 6 Drawing Sheets

(56) References Cited

U.S. PATENT DOCUMENTS

| | | | | | |
|---|---|---|---|---|---|
| 5,348,210 | A * | 9/1994 | Linzell | B23K 35/02 228/115 |
| 6,438,788 | B1 | 8/2002 | Gartner | |
| 7,028,365 | B2 * | 4/2006 | Martin | B05C 17/02 492/19 |
| 9,573,161 | B2 * | 2/2017 | Goodwin, Jr. | B05C 17/0205 |
| 2003/0126711 | A1 | 7/2003 | Korenevsky | |
| 2004/0181893 | A1 | 9/2004 | Martin et al. | |
| 2009/0089952 | A1 | 4/2009 | Smith et al. | |

FOREIGN PATENT DOCUMENTS

| | | | | |
|---|---|---|---|---|
| WO | WO-2004009250 | A1 * | 1/2004 | B05C 17/02 |
| WO | WO-2009073871 | A1 * | 6/2009 | B05C 17/02 |
| WO | 2016053861 | A1 | 4/2016 | |
| WO | 2016099395 | A1 | 6/2016 | |

OTHER PUBLICATIONS

International Search Report and Written Opinion from corresponding International Application No. PCT/CN2020/141493 mailed on Mar. 25, 2021, 12 pages.

Extended European Search Report from corresponding European Application No. 20908798.0 mailed on Feb. 5, 2024, 8 pages.

* cited by examiner

COATINGS ROLLER ASSEMBLY WITH IMPROVED FRAME

BACKGROUND

A coatings roller typically has a roller cage rotatably fixed on a frame wire. A coatings roller cover can be attached over the roller cage and used to apply coatings to a surface. The roller cage and roller cover rotate smoothly to allow the roller cover to distribute the coating effectively. It is desirable to allow the roller cover to be removed from the coatings roller, but for the roller cage to remain captured on the frame wire.

To achieve these objectives, coatings rollers can have bearings fixed to the frame wire, which promote smooth rotation of the roller cage around the bearings, while also acting as a stop to mitigate accidental removal of the roller cage from the frame wire. There are few common ways that the bearings can be fixed to the frame wire. As an example, peening, swedging, pinning, or threading may be used in combination with or without a washer to hold the bearings on the frame.

Using these types of methods and techniques can potentially weaken and reduce the structural integrity and strength of the frame wire.

For example, forming a hole in the frame wire for the use of a pin, or deforming the frame wire to create a catch may reduce the structural integrity of the frame wire. This can lead to failure of the frame wire when, for example, a longer roller cage and roller cover are being used, heavier product is being used in conjunction with the roller cover, and/or if the user is applying a greater force on the coatings roller.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a coatings roller assembly, including a coatings roller frame and a roller cage. The roller assembly can comprise a handle coupled with a wire frame configured to operably hold a roller cage. Bearings can be fixed to the roller frame at a first and second end. Instead of using typical pinning or swedging techniques for holding the bearing, a sleeve can be crimped into place over a treated surface of the wire frame at the first end. In this way, for example, the structural integrity of the wire frame can be substantially maintained, providing for improved durability and a longer life for the roller assembly.

In one implementation of coatings application roller cage apparatus a frame wire can comprise a first end and second end, a first bend, second bend, and third bend, a treated portion comprising a roughened surface between the second end and third bend. Further, in this implementation, the roller cage apparatus can comprise a swedge disposed proximate the third bend between the second end and third bend of the frame wire. An inner bearing and outer bearing can be fixed to the frame wire to operably mitigate rotation around the frame wire. A sleeve can be fixedly crimped onto the treated portion, the inner bearing disposed between the sleeve and the swedge. Additionally, an inner bushing can be operably disposed on the inner bearing, and an outer bushing can be disposed on the outer bearing. A roller cage can be disposed over the inner bushing and outer bushing.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
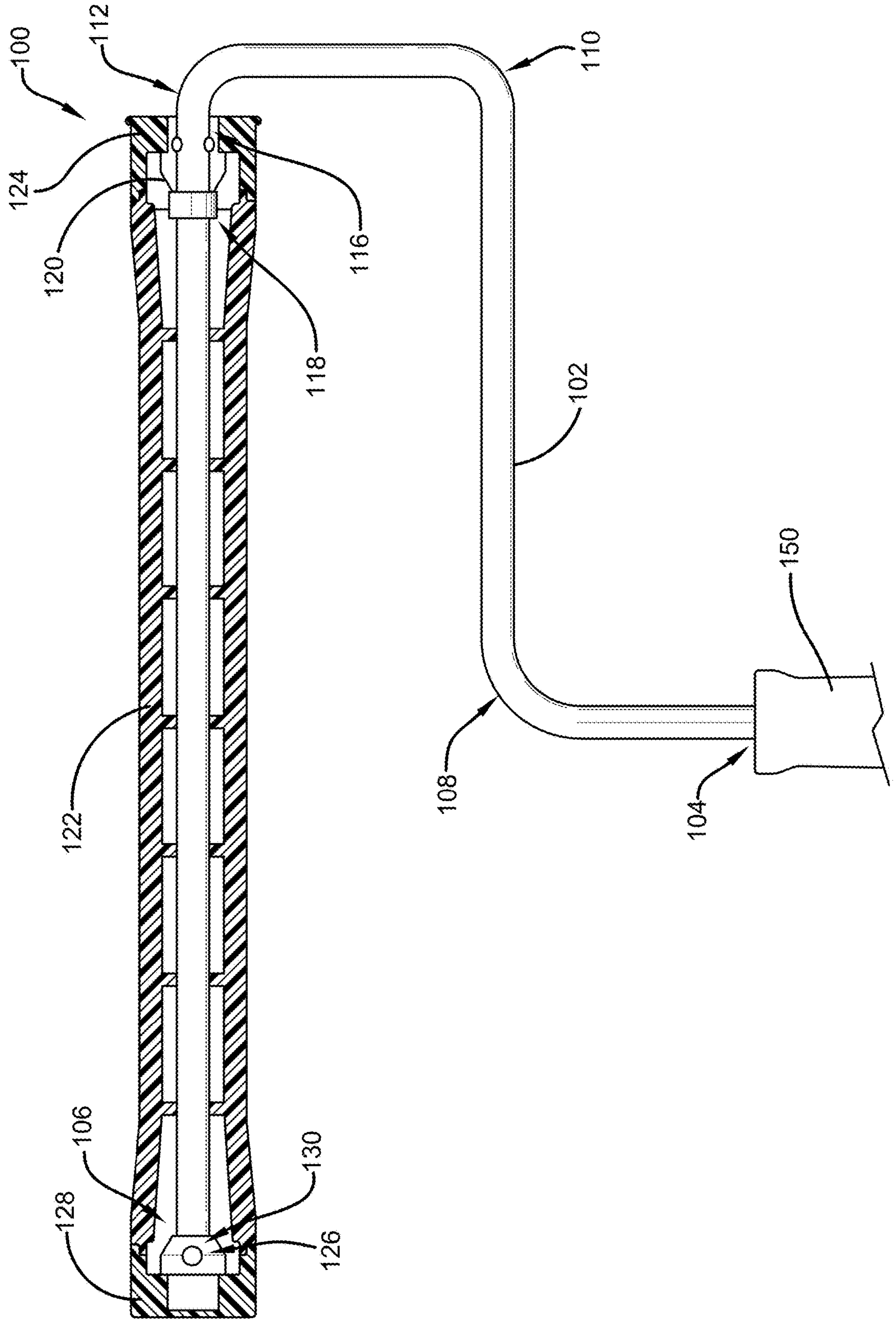
FIG. 1 is a front, partially cross-sectional, view of a coatings roller assembly including an example implementation of a crimped sleeve on a frame wire where one or more portions of one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Systems and techniques can be devised for creating a roller cage assembly that uses a crimped sleeve disposed over a treated surface of a wire frame to operably hold roller bearings in place. In one aspect, a coatings roller assembly can comprise a coatings roller frame and a roller cage, where the roller frame comprises a frame wire. In this aspect, the frame wire can comprise a sleeve that is crimped or otherwise secured into place along the roller frame. In one implementation, the crimped sleeve can provide for more effective retention of an inner bearing and, thus the roller cage on the frame wire. As an example, capturing the roller cage on the frame wire using the sleeve can mitigate compromising the integrity and strength of the frame wire. In this example, improved strength can reduce incidence of failure during use. As a result, longer, heavier, and more robust frame wires and roller cages can be created and used by the one or more apparatus described herein. The increased strength may also allow for the use of heavier products in combination with the coatings roller.

Accordingly, in one implementation, the coatings roller assembly can comprise the roller frame, the roller cage, the frame wire, a handle, the inner bearing, an outer bearing, an inner bushing, and an outer bushing. In this implementation, the frame wire has a first end, a second end, a first bend, a second bend, and a third bend. A sleeve can be engaged with the frame wire (e.g., by sliding it over the second end of the frame wire), and the sleeve can be positioned at a desired location along the frame wire between the second end of the frame wire and the third bend in the frame wire. The sleeve can be fixedly engaged the wire, such as by crimping it into place in the desired position. As one example, an initial shape of the sleeve may be annular or ring-like, with an internal diameter larger than the external diameter of the frame wire. In this example, after the sleeve is crimped it can comprise a polygonal (e.g. hexagonal) shape. As an example, a hexagonal shape can provide six locations where a friction force fit is applied to the frame wire. Further, determining that the polygonal shape (e.g. hexagonal crimp shape) has been created in accordance with a desired specification (e.g., amount of desired force applying a specified shape and size) may be determined by applying a shaped tool (e.g., a hexagonally shaped tool). For example, the tool can comprise a void shaped and sized to accommodate a properly crimped sleeve. In this example, if the crimped sleeve fits within the shaped void of the tool, the crimp can be considered to have been created properly. As an example, the sleeve can be crimped using a hydraulic press, or other suitable means. Additionally, the sleeve can be formed from aluminum, or other suitable metals, such as steel, bronze, brass, etc.

In one implementation, in order to improve mechanical interference between the frame wire and the sleeve, the frame wire can be treated. As an example, the frame wire surface can be treated by knurling the surface, or otherwise roughing the surface using such processes and tools, for example, as striations and rings. Other mechanical or chemical processes may be used to treat the surface of the frame wire to improve friction fit with the sleeve. Increasing the friction and physical contact between the inner surface of the sleeve and the outer surface of the frame wire can help improve the strength of the connection, and thus improve the ability of the sleeve to hold the roller cage on the frame wire. In one implementation, the surface treatment can be performed merely in the area over which the sleeve is to be positioned. For example, the appropriate crimp strength and desired sleeve deformation, needed to create the strong capture of the roller cage on the frame wire, can be achieved without fracturing or breaking the sleeve in the crimping process.

It is to be appreciated that there are other ways, or other combinations of ways, of attaching the sleeve to the frame wire. For example, soldering, welding, an adhesive or glue, various forms of interference fits, dissimilar materials - such as a plastic to metal connection, a collar in combination with an Allen key, or a process to treat a plastic sleeve whereby the sleeve is heated to allow it to expand and then to shrink around the frame wire as it cools, may be used. An adhesion promotor may also be used in combination with any of these methods.

In one implementation of manutacturing a roller cage assembly, prior to assembling the sleeve on the frame wire, a portion of the surface of the frame wire can be treated (e.g., roughened). The treated portion can comprise the location on the frame wire that the sleeve will be placed, such as near the third bend, along a long straight portion where the roller frame is operably disposed. Further, in this implementation, a swedge can be formed or placed proximate the third bend of the frame wire. As an example, the swedge can be formed by crimping or pressing a portion of the surface of the frame wire to create at least one raised portion (e.g., an ear) on the wire. As an example, the swedge can mitigate translation of the inner bearing toward the third bend, and mitigate rotation of the bearing without potential weakening of the structure of the frame wire. In one example, the swedge can be located along the frame wire between the area of the surface that is treated with the knurling and the third bend.

In some implementations, a washer can be disposed on the wire frame proximate the swedge. For example, the washer may be placed over the second end (e.g., slid over) and positioned at the swedge. Further, in this implementation, the inner bearing can be placed on the frame wire, for example, by sliding it over the second end of the frame wire and positioned along the frame wire until it is stopped by the washer and/or the swedge, which has been placed or formed proximate the third bend. In some implementations, the bearing may engage a portion of the swedge to mitigate rotation of the bearing around the wire. For example, in order to receive the ear of the swedge, the inner bearing can be formed with at least one cut-out within an inner surface of the inner bearing. In this implementation, the cut-out can be shaped such that the ear can slot into the cut-out and hold the inner bearing in the desired position, angularly and axially.

In one implementation, with the inner bushing disposed on the frame wire, the (e.g. initially ring-shaped) sleeve can be placed on the frame wire (e.g., by sliding over the second end of the frame wire), and positioned over the treated (e.g., knurled) area of the frame wire, and crimped to deform the sleeve to the desired shape (e.g. hexagonal). In this implementation, the inner bearing is fixed to the frame wire by the swedge and the sleeve (e.g., and washer). In this way, for example, the bushing is fixed to the frame wire such that rotation of the bearing is mitigated during operation, and the strength and integrity of the frame wire is maintained.

Further, in some implementations, the inner bushing can be disposed over a cylindrical portion of the inner bearing, to provide a smooth surface that promotes rotation of the inner bushing, and thus the roller cage. In these implementations, the inner bushing can be place on the frame and engaged with the inner bearing. For example, the inner bushing can be placed (e.g., slid) over the second end of the frame wire, and disposed on the bearing at a desired position between the second end of the frame wire and the third bend.

In some implementations, a hole can be formed through the frame wire proximate the second end. For example, the hole can extend perpendicular to the axis of the frame wire and can have a cylindrical cross-section. In this implementation, the outer bearing can comprise a matching hole that aligns with the hole on either side of the frame wire. The outer bearing can be disposed on the second end of the frame wire and can be positioned to align the holes of the outer bearing with the hole in the frame wire. In this implementation, a pin can be inserted through the holes in the outer bearing and the hole in frame wire, thereby fixing the outer bearing angularly and axially to the frame wire. As an example, forming a hole in the frame wire may be less of a concern when disposed proximate the second end of the frame wire because there may be less of a moment arm operably created in the frame wire at the hole the further away the hole is from the third bend. Fixing the outer bearing can mitigate translation of the roller cage toward the third bend, and/or off the second end.

In one implementation, the roller cage can be disposed on the frame wire, for example, by sliding it over the second end of the frame wire, over the outer bearing, and over the inner bearing. In this implementation, an inner end of the roller cage can be press-fit into the inner bushing disposed at the inner bearing. For example, the outer surface of the inner bushing and the inner surface of the inner end of the roller cage can have complimentary formations, (e.g., tabs and recesses) to promote secure interlocking of the inner bushing and the roller cage. Further, the outer bushing can be rotatably disposed on a cylinder of the outer bearing, which promotes smooth rotation of the outer bushing and roller cage on the outer bearing, proximate the second end of the frame wire. In one example, the outer end of the roller cage can be press-fit into the outer bushing. Further, in an example, the outer surface of the outer bushing and the inner surface of the outer end of the roller cage can have complimentary formations to promote secure interlocking of the outer bushing and the roller cage.

In other examples, the connections of the inner bushing and the outer bushing to the roller cage may be opposite the previous example. In such other examples, the bushings can be press-fit into the ends of the roller cage. In these examples, the outer surfaces of the roller cage, and the inner surfaces of the bushings may have complimentary formations (e.g., tabs and recesses) to promote secure interlocking of the bushings and the roller cage.

In one implementation, the roller cage may comprise a dog-bone shape, which tapers in the middle. In some implementations, the roller cage may comprise a cylindrical shape. In one example, the roller cage may be one of the known lengths, such as approximately nine inches, or nine-and-a-half inches. In another example, the roller cage may comprise a length of approximately fourteen inches. The length of the frame wire between the third bend and the second end may be greater than or equal to the length of the fully assembled roller cage (e.g. roller cage with the bushing attached at either end).

In one implementation, a roller cover may be operably, removeably attached to the roller cage by sliding it over the second end of the frame wire, over the outer bushing, and along the length of the roller cage until an inner end of the roller cover is aligned with an inner end of the inner bushing. In one example, the roller cover may be equal to the length of the fully assembled roller cage.

In one implementation, the frame wire may be configured to reduce the weight of the coatings roller assembly. As an example, the frame wire may be comprised of aluminum, steel, or other appropriate metals. In some implementations, a steel wire may be coated with zinc or chrome, which may improve the strength and/or corrosion resistance of the frame wire. Further, in one example, the frame wire may have a thickness of three-eighths of an inch, five-sixteenths of an inch, or any other suitable thickness for the given application. Improving the strength of the frame wire by using zinc- or chrome-coated steel, in combination with using a lesser thickness, may produce a more durable frame while also retaining, or improving, the light-weight nature of the coatings roller assembly.

In one implementation, a handle may be attached to the first end of the frame wire. Any means for interlocking the frame wire to the handle within the sound judgment of those of skill in the art may be used. In one example, the handle may have a first end defining a chamber which is configured to receive the first end of the frame wire and a length of the frame wire between the first end of the frame wire and the first bend. In some examples, the first end of the frame wire or the frame wire proximate the first end may have a handle engagement portion configured to secure the wire frame to the handle. The handle engagement portion may be a sleeve, which surrounds the frame wire. The sleeve may be attached by any suitable means, such as heat-shrinking or an adhesive. In one example, an interlocking ball pin may be embedded within the first end of the wire frame by a swedge to engage the sleeve. In some examples, the sleeve may include ribs designed to engage corresponding ribs positioned within the chamber of the handle. In another example, the handle engagement portion may have external threads configured to engage corresponding internal threads in the chamber of the handle. In another example, the frame wire may be press-fit directly into the chamber of the handle. The chamber and handle may also be heated for attachment with the handle engagement portion and consequently allowed to shrink around the handle engagement portion as the chamber and handle cool.

In one implementation, the second end of the handle may be designed to engage an insert. In one example, the insert may be threadably or adhesively engages with the handle. The insert may also be press-fitted into the handle. Further, for example, the insert may include internal treads designed to engage complimentary external threads on an extension pole. The extension pole may be engaged the handle to provide increased reachability to the user.

As illustrated in FIG. 1, comprising a component diagram of an exemplary apparatus 100 in accordance with one or more portions of one or more systems described herein. In some implementations, the exemplary apparatus can comprise a coatings application roller cage apparatus used to operably hold a roller cover to apply coatings, such as paint. In this implementation, the example apparatus 100 comprises a frame wire 102 having a first end 104 and a second end 106. Further, between the first end 104 and the second end 106, the frame wire 102 comprises a first bend 108, a second bend 110, and a third bend 112. As illustrated, for example, the first, second, and third bends 108, 110, 112 form a "U"-shape, that disposes the portion of the frame wire 102 between the third bend 112 and second end 106 substantially perpendicular to the portion of the frame wire 102 between the first end 104 and the first bend 108. The frame wire 102 can be comprised of any suitable material for forming a support wire frame, such as metal, plastic (e.g., any suitable polymer), wood, fiberglass, carbon fiber, or combinations thereof.

In some implementations, a handle 150 can be disposed at the first end 104 of the frame wire 102. The handle 150 can be configured to be operably held by a user or operator of the apparatus 100, such as when applying a coating. In some implementations, the handle 150 can comprise a coupler that allows the handle to be operably coupled to a tool, such as an extension pole, or the like.

Figure 2A:
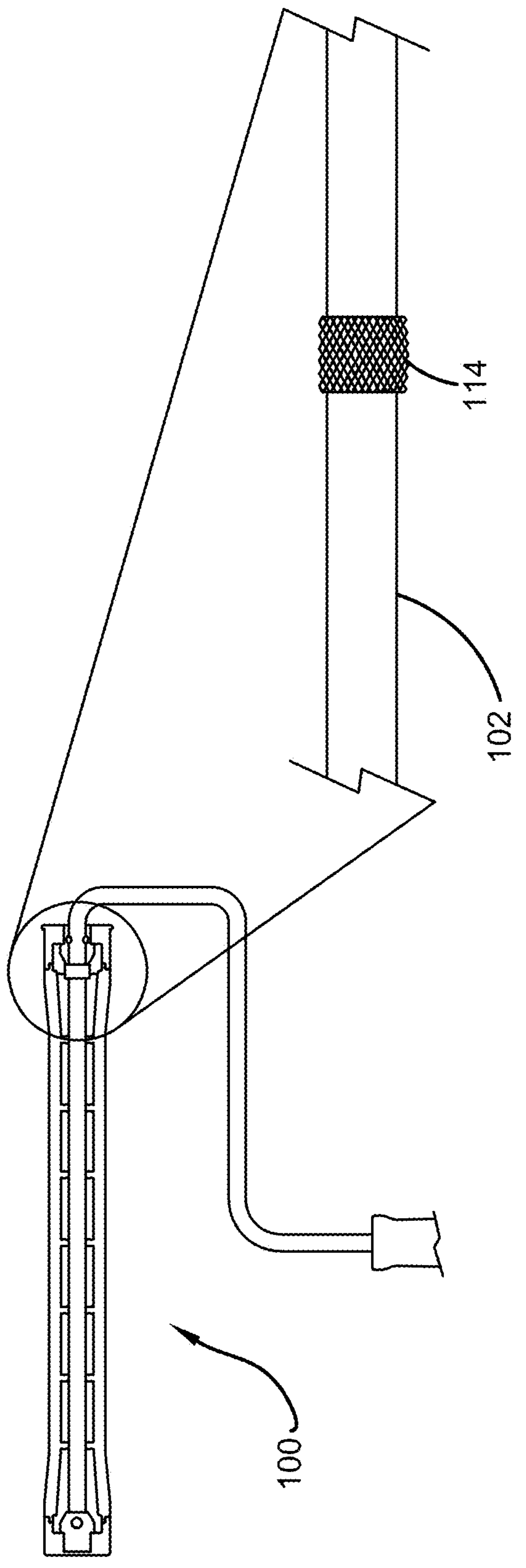
FIGS. 2A and 2B are component diagrams illustrating one or more portions of the roller assembly described herein.
Figure 2B:
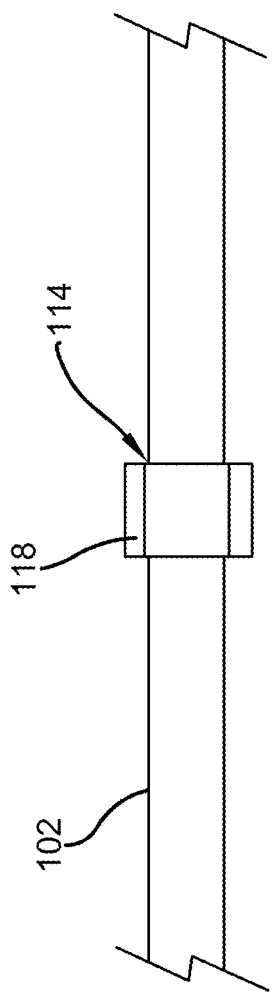

As illustrated in FIGS. 1, 2A, and 2B, the example, apparatus 100 can comprise a treated portion 114 that is disposed on the frame wire 102 between the second end 106 and the third bend 112. In some implementations, the treated portion 114 can comprise a roughened surface (e.g., rougher than the untreated wire frame 102 surface). As an example, the roughed surface can comprise a patterned area that comprises a pattern formed into (e.g., pressed into, molded, filed, etched, engraved, or otherwise shaped) the surface of the frame wire 102. As another example, the roughed surface can comprise an abraded area that is formed into the surface of the frame wire 102.

As illustrated, a first stop 116 is disposed on the frame wire 102 proximate to the third bend 112, between the second end 106 and the third bend 112. In some implementations the first stop 116 can comprise a swedge that is formed (e.g., pressed, welded, crimped, molded, etc.) into the frame wire 102. In another implementation, the first stop 116 can comprise a pinned arrangement, such as a pin disposed through a via in the frame wire 102. In other implementations the first stop 116 can comprise a device attached to the frame wire 102 at the stop location, such as a clip disposed in a channel, a press nut force fit onto the frame wire 02, or similar appropriate arrangements for forming a mechanical stop.

Further, as illustrated, the exemplary apparatus 100 can comprise a second stop 118 that is fixed onto the treated portion 114, between the first stop 116 and the second end 106. In some implementations, as illustrated in FIG. 2B, the second stop 118 can comprise a sleeve or ring that is force fit onto the treated portion 114. In some implementations, the second stop 118 can be crimped onto treated portion 114 of the frame wire. That is, for example, the treated portion 114 can be formed onto the frame wire 102, a sleeve or ring can be fitted over the treated portion 114, and the sleeve or ring can be crimped in place to form a fixedly engaged second stop 118 on the frame wire 102.

In some implementations, the treated portion 114 can comprise an area that is sized merely to fit the second stop 118, such that the second stop 118 covers most or all of the treated portion 114. In some implementations, the treated portion 114 can comprise a coating that provides an adherence surface for the second stop 118 on the wire frame 102. That is, for example, an adhesive can be applied at the treated portion 114, and the second stop (e.g., sleeve) can be fit over the treated portion 114, and then second stop 118 can be fixed in place by crimping. In this way, for example, a crimped sleeve may provide for an improved adherence to the frame wire 102 in combination with the treated portion, such as using the roughened area or adhesive coated area. As an example, a sleeve can be crimped onto a patterned area of the frame wire 102 to provide improved fixed engagement of the sleeve, for longer use life of the apparatus 100.

As illustrated in FIGS. 1, 2A, and 2B, the example apparatus can comprise an inner bearing 120 that is engaged with the frame wire 102. The inner bearing 120 can be disposed between the second stop 118 and the first stop 116. That is, for example, the first stop 116 and second stop 118 provide stops to the bearing with regard to lateral movement along the frame wire 102. In this example, the second stop 118 can mitigate lateral movement of the inner bearing 120 along the frame wire 102 toward the second end 106, and the first stop 116 can mitigate lateral movement of the inner bearing 120 along the frame wire 102 toward the third bend 112. In one implementation, at least a portion of the inner bearing 120 can be fixedly engaged with the first stop 116 to operably mitigate rotation of the inner bearing 120 with respect to the frame wire 102. That is, for example, during operation, the inner bearing 120 can remain stationary on the frame wire 102 when engaged with the first stop 116.

Figure 3A:
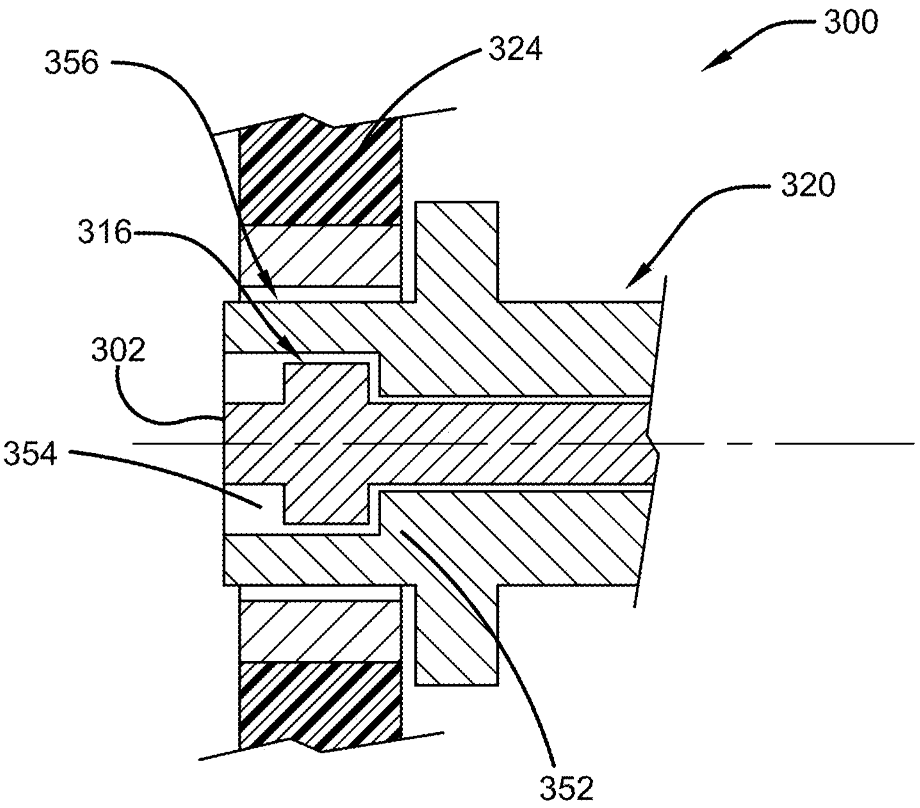
FIGS. 3A and 3B are component diagrams illustrating one or more portions of the roller assembly described herein.

As an illustrative example, as illustrated in FIG. 3A, a swedge 316 can be formed in a frame wire 302 of an example apparatus 300. In this example, a body portion 352 of an example bearing 320 can comprise one or more slots 354. In this example, the slots 354 can be configured to be complementary to the swedge(s) formed in the frame wire 102, such that the bearing body 352 can engage with, and slide over the swedge(s). In this way, for example, during operation the engagement of the slots 354 in body 352 with the swedge(s) 316 can prevent the bearing 320 from rotating around the frame wire 302. As an example, this type of complementary arrangement of the bearing 320 with the first stop (e.g., swedges 316) may facilitate manufacturing of the apparatus 300, such that a bearing 320 can be easily slid onto the frame wire from the second end, and engage with the swedges 316 (e.g., of other complementary stop). In other implementations, the bearing body 352 can be heat pressed onto the swedges 316 such that the body 352 is formed onto the swedge 316.

As illustrated in FIGS. 1, 2A, 2B, and 4, a coating applicator cage frame 122 can be disposed over the inner bearing 120 to operably rotate with rotation of the inner bearing 120. In one implementation, an inner busing 124 can be operably disposed on the inner bearing 120, where the inner bushing 124 is also disposed in contact with the with the coating applicator cage frame 122. Further, in some implementations, the example apparatus 100 can comprise an outer bearing 126 that is disposed proximate the second end 106 of the frame wire 102. Additionally, an outer bushing 128 can be disposed on the outer bearing 126 and engaged in contact with the coating applicator cage frame 122. In one implementation, the outer bearing 126 can be fixedly engaged with the frame wire 102 with a pinned arrangement 130. That is, for example, a pin may be inserted through the outer bearing 126 and through the frame wire 102 to operably mitigate rotation of the outer bearing 126 around the frame wire 102. It should be appreciated that any suitable fastening arrangement is contemplated between the outer bearing 126 and the frame wire 102 that can operably mitigate rotation of the bearing 126 around the frame wire 102.

As one example, in this arrangement, both the inner bushing 124 and the outer bushing 128 can be operably, fixedly engaged with an external portion of the inner and outer bearings 120, 126 respectively. In this way, the bushings 124, 128 can operably rotate with the respective bearings 120, 126. Additionally, for example, the respective bushings 124, 128 are operably, fixedly engaged with the coating applicator cage frame 122, such that the frame 122 can rotate with the respective bushing 124, 128 around the frame wire 102, by way of the respective bearings 120, 126.

As an illustrative example, as illustrated in FIG. 3A, with continued reference to FIGS. 1, 2A, and 2B, an inner bushing 324 can be operably engaged with and external surface 356 of the inner bearing 320. In this example, the inner bushing 324 may operably rotate around the external surface 356 of the inner bearing 320. Further, in some implementations, the bearing body 352 may be comprised of a suitable material (e.g., polymer, metal, etc.) that provides for a surface 356 (e.g., which may comprise a lubricant) that mitigates wear when subjected to the rotation of the inner bushing 324 during use. Further, the inner bushing 324 can be comprised of a suitable material (e.g., polymer, metal, etc.) that mitigates wear when subjected to the rotation of the inner bushing 324 during use. In some implementations, merely the surface 356 (e.g., or inner surface of the bushing) may comprise a suitable lubricant material, such as Teflon or the like. In this way, for example, the respective bearings 120, 126 and/or bushing 124, 128 may provide a longer use life, with less wear from use.

Figure 3B:
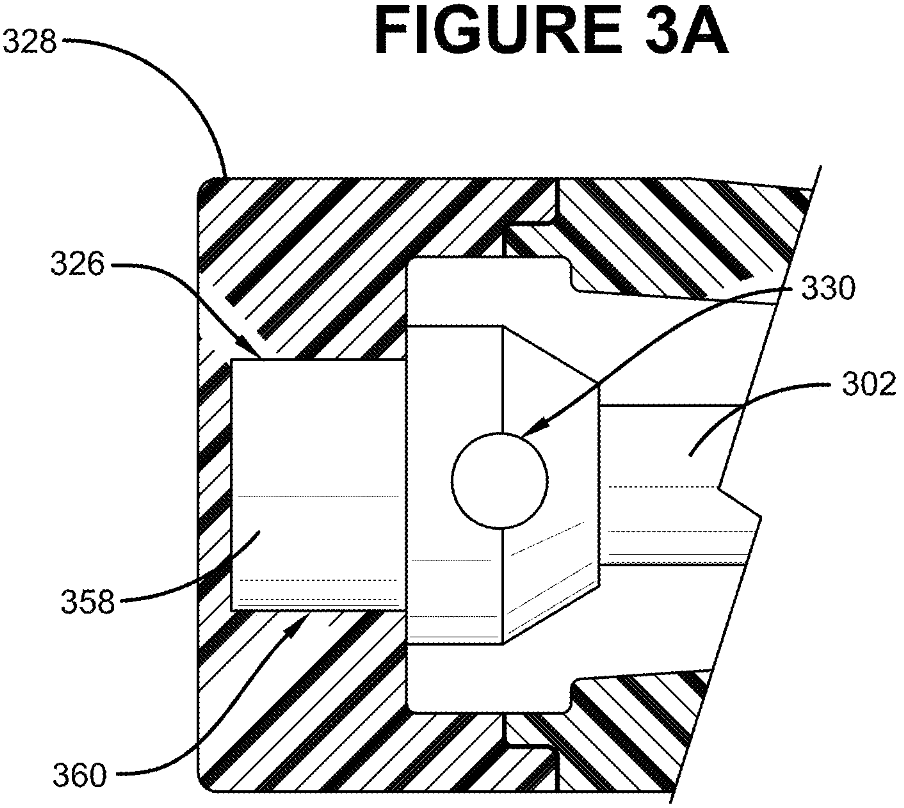
Figure 4:
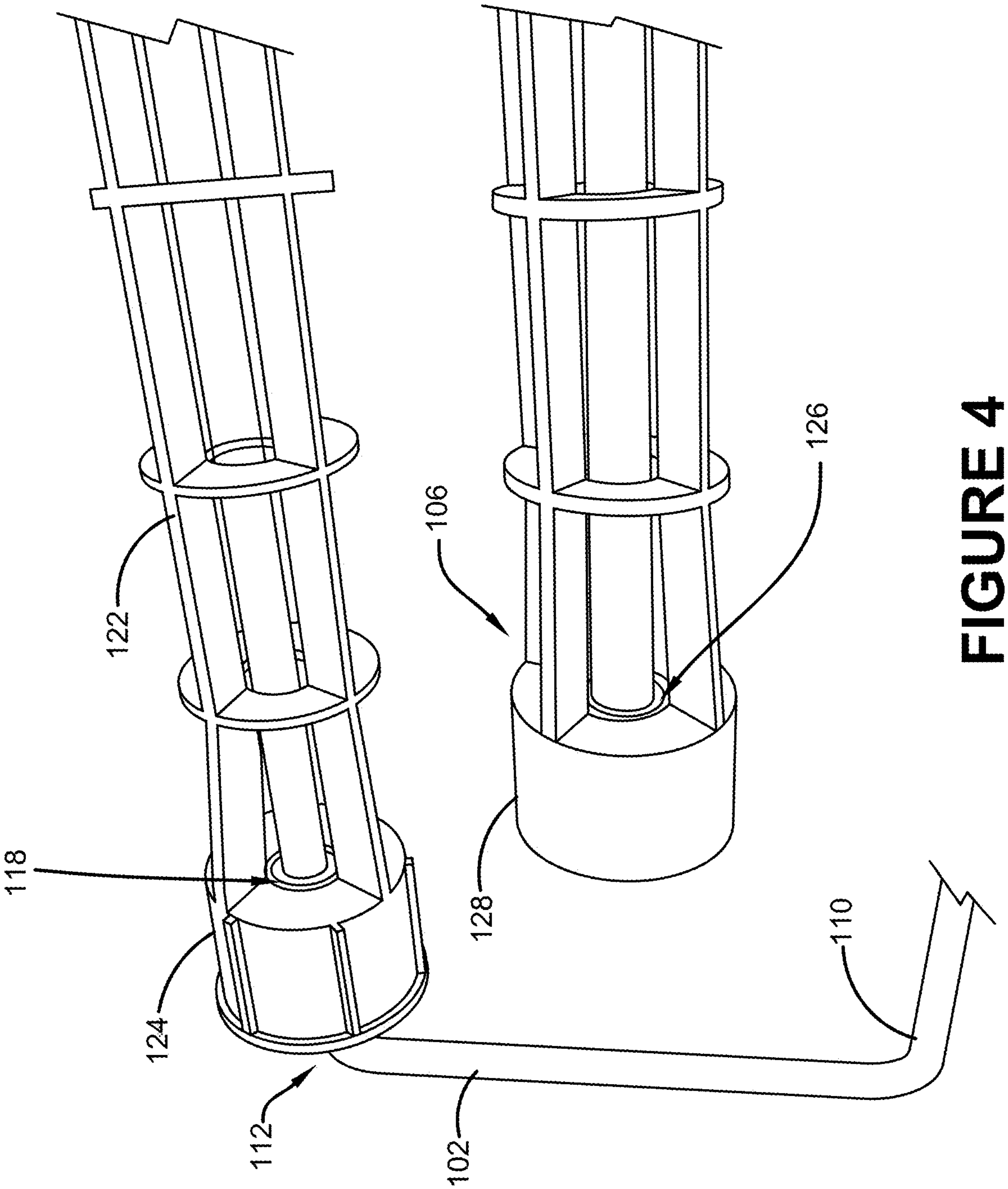
FIG. 4 is a component diagram illustrating one or more portions of the example roller assembly described herein.

As illustrated in FIG. 3B, with continued reference to FIGS. 1, 2A, and 2B, an outer bearing 326 can be engaged with the frame wire 302 in a pinned arrangement 330. That is, for example, a pin can be disposed through a hole in the outer bearing 326 and in the frame wire 302 to operably mitigate rotation of the outer bearing's bearing body 358 around the frame wire 302. It should be appreciated that the outer bearing 326 may be fixedly engaged with the frame wire 302 using other means described herein, such as the swedge arrangement of FIG. 3A. As illustrated, an outer bushing 328 can be operably engaged with outer bearing 326 at its outer surface 360. In some implementations, the outer bushing 328 can be operably, fixedly engaged with the coating applicator cage frame 122, and can rotate around the external surface 360 of the outer bearing 326. As described above, the respective outer bushing 328 and outer bearing 326 can be made of suitable materials (e.g., and/or surface coatings) that mitigate wear, and provide for smooth rotation of the bushing 328 around the bearing 326.

In an alternate implementations, the respective bearings 320, 326 may comprise internal components (e.g., ball bearings, raceways, etc.) that allow an outer portion of the bearing to rotate around an inner portion of the bearing. In these implementations, for example, the inner portion of the bearing can be fixed to the frame wire, and the outer portion of the bearing can be fixed to the associated bushing. In this way, for example, the bushing can rotate around the frame wire using the rotatable bearing.

In aspect, a method can be devised for manufacturing a roller cage assembly that uses a crimped sleeve disposed over a treated surface of a wire frame to operably hold roller bearings in place. That is, for example, the one or more techniques may provide for an efficient method for making such a device, with allows for improved life of use, along with improved ease of manufacture.

Figure 5:
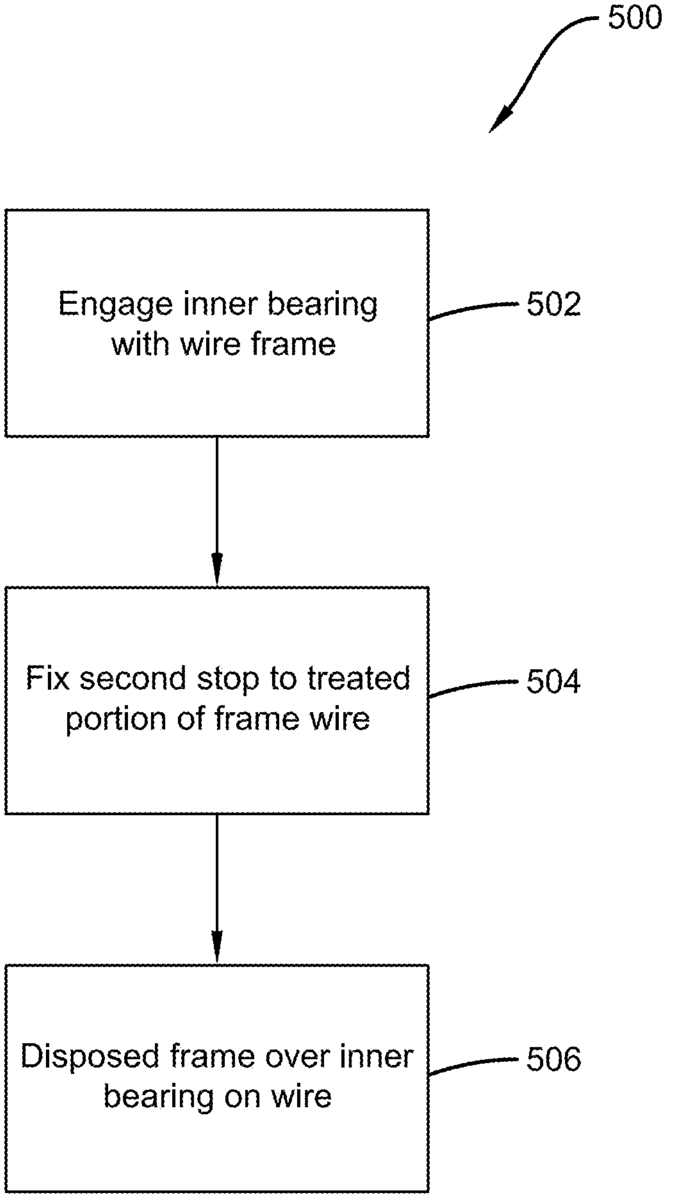
FIG. 5 is a flow diagram illustrating an example method for constructing a roller assembly described herein.

FIG. 5 is a flow diagram illustrating an exemplary method 500 for manufacturing a coatings application roller cage apparatus. In this implementation, at 502, an inner bearing can be engaged with a frame wire. The frame wire can comprise a first end and second end, a first bend, second bend, and third bend, a treated portion disposed between the second end and third bend. Further, the frame wire can comprise a first stop disposed on the frame wire proximate the third bend between the second end and third bend. In some implementations, the engaging of the inner bearing with a frame wire can comprise fixedly engaging at least a portion of the inner bearing with the first stop to operably mitigate rotation of the inner bearing with respect to the frame wire. At 504, the example method 500 can comprise fixing a second stop onto the treated portion between the first stop and the second end. In some implementations, the fixing of the second stop onto the treated portion can comprise crimping a sleeve or ring onto the treated portion. At 506, a coating applicator cage frame can be disposed over the inner bearing to operably rotate around the inner bearing.

Figure 6:
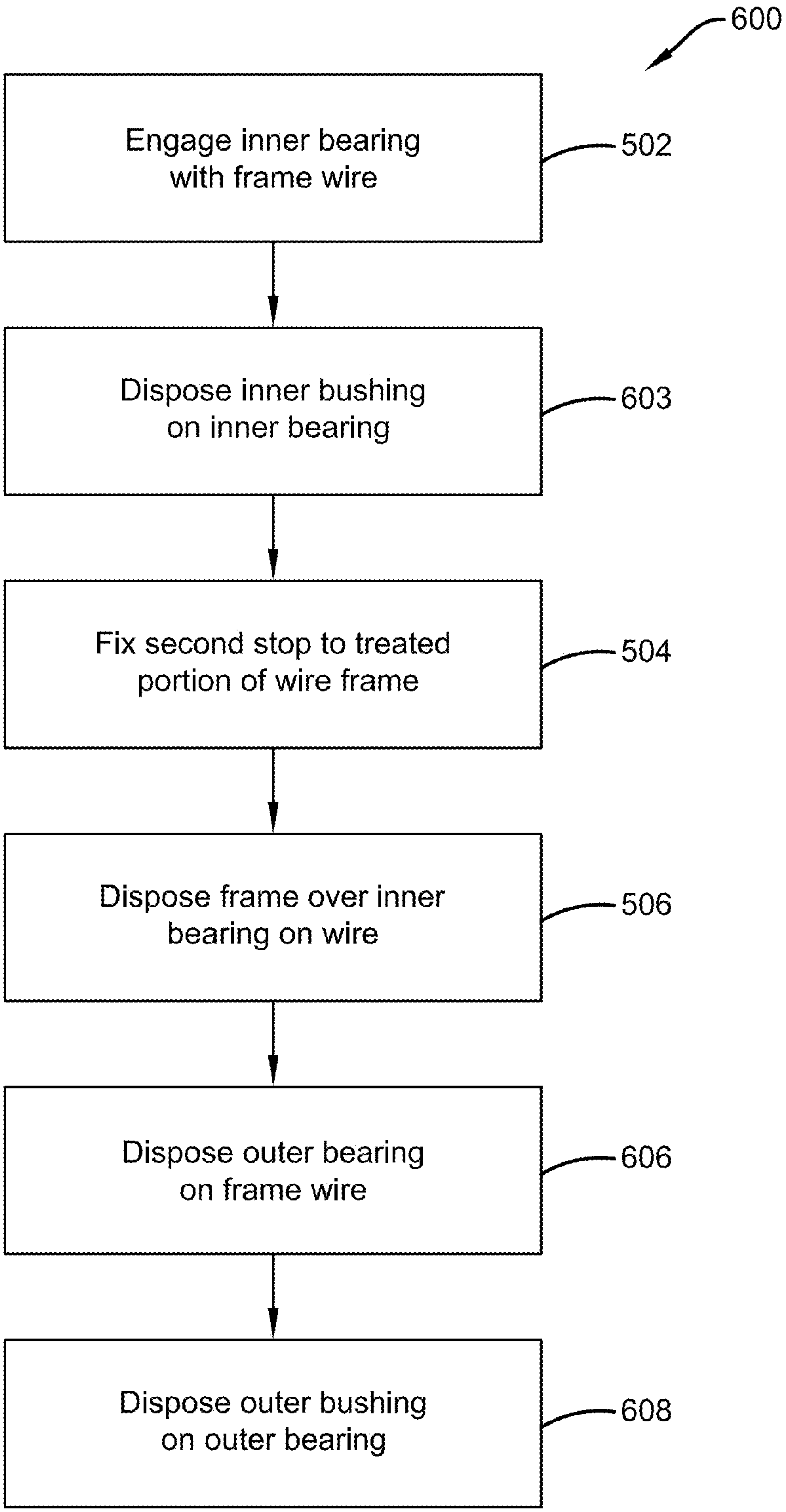
FIG. 6 is another flow diagram illustrating another method for constructing one or more portions of the roller assembly described herein.

In some implementations, as illustrated in FIG. 6, the example method 500 of manufacturing a coatings application roller cage apparatus can comprise and alternate method 600, including alternate steps. In this method 600, at 603 an inner bushing can be disposed on the inner bearing (e.g., in rotational engagement), such that the inner bushing is in contact with the coating applicator cage frame. At 608, an outer bearing can be engaged with the frame wire, proximate the second end of the frame wire. Further, at 610, an outer bushing can be disposed on the outer bearing (e.g., in rotational arrangement) and in contact with the coating applicator cage frame.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A coatings application roller cage apparatus, the apparatus comprising:

a frame wire comprising a first and second, a first bend, second bend, and third bend, a treated portion disposed between the second end and third bend, wherein the treated portion comprises a portion of the surface of the frame wire that is altered to provide increased friction;

a first stop disposed on the frame wire proximate the third bend between the second end and third bend;

a second stop fixed onto the treated portion between the first stop and the second end, wherein the second stop is positioned nearer the third bend than the second end;

an inner bearing engaged with the frame wire, the inner bearing disposed between the second stop and the first stop, wherein the first stop and the second stop are disposed on either side of, and adjacent to, the inner bearing to operably provide stops to the inner bearing with regard to lateral movement along the frame wire; and a coating applicator cage frame disposed over the inner bearing to operably rotate around the inner bearing.

2. The apparatus of claim 1, comprising an inner bushing operably disposed on the inner bearing and in contact with the coating applicator cage frame.

3. The apparatus of claim 1, comprising an outer bearing disposed proximate the second end of the frame wire, and an outer bushing disposed on the outer bearing and in contact with the coating applicator cage frame.

4. The apparatus of claim 3, the outer bearing fixedly engaged with the frame wire with a pinned arrangement.

5. The apparatus of claim 1, the treated portion comprising an area sized to merely fit the second stop.

6. The apparatus of claim 5, the treated portion comprising a coating that provides an adherence surface for the second stop on the wire frame.

7. The apparatus of claim 1, the treated portion comprising a roughened surface.

8. The apparatus of claim 7, the roughened surface comprising one or more of a patterned area comprising a pattern formed into the surface of the frame wire;

and an abraded area formed into the surface of the frame wire.

9. The apparatus of claim 1, the second stop comprising a sleeve or ring force fit onto the treated portion.

10. The apparatus of claim 1, the second stop comprising a crimped sleeve fixed onto the treated portion.

11. The apparatus of claim 1, the first stop comprising one of:

a swedge; and a pin.

12. The apparatus of claim 1, at least a portion of the inner bearing fixedly engaged with the first stop to operably mitigate rotation of the inner bearing with respect to the frame wire.

13. The apparatus of claim 1, comprising a handle configured to be operably held by an operator of the apparatus, the handle disposed at the first end.

14. A coatings application roller cage apparatus, the apparatus comprising:

a frame wire comprising a first end and second end, a first bend, second bend, and third bend, a treated portion disposed between the second end and third bend, wherein the treated portion comprises a roughened area of the frame wire;

a first stop disposed on the frame wire proximate the third bend between the second end and third bend;

a second stop fixed onto the treated portion between the first stop and the second end, wherein the second stop comprises a sleeve or ring crimped onto the treated portion, and wherein the second stop is positioned nearer the third bend than the second end;

an inner bearing fixedly engaged with the frame wire, the inner bearing disposed between the second stop and the first stop, wherein the first stop and the second stop are disposed on either side of, and adjacent to, the inner bearing to operably provide stops to the inner bearing with regard to lateral movement along the frame wire;

a coating applicator cage frame disposed over the inner bearing to operably rotate around the inner bearing;

an inner bushing operably rotatable around the inner bearing and in fixed engagement with the coating applicator cage frame;

an outer bearing fixedly engaged with the frame wire proximate the second end; and an outer bushing operably rotatable around the outer bearing and in fixed engagement with the coating applicator cage frame.

15. A method of manufacturing a coatings application roller cage apparatus, the method comprising:

engaging an inner bearing with a frame wire, wherein the frame wire comprises: a first end and second end, a first bend, second bend, and third bend, treating a portion of the frame wire resulting in a treated portion disposed between the second end and third bend, wherein the treated portion comprises a portion of a surface of the frame wire that is altered to provide increased friction;

fixing a first stop disposed on the frame wire proximate the third bend between the second end and third bend;

fixing a second stop onto the treated portion between the first stop and the second end, wherein the second stop is positioned nearer the third bend than the second end; and disposing a coating applicator cage frame over the inner bearing to operably rotate around the inner bearing;

wherein the first stop and the second stop are disposed on either side of, and adjacent to, the inner bearing to operably provide stops to the inner bearing with regard to lateral movement along the frame wire.

16. The method of claim 15, comprising disposing an inner bushing on the inner bearing and in contact with the coating applicator cage frame.

17. The method of claim 15, comprising engaging an outer bearing proximate the second end of the frame wire, and disposing an outer bushing on the outer bearing and in contact with the coating applicator cage frame.

18. The method of claim 15, wherein treating the portion of the frame wire comprises developing a roughened surface, wherein the roughened surface comprises one of:

a patterned area comprising a pattern formed into the surface of the frame wire; and an abraded area formed into the surface of the frame wire.

19. The method of claim 15, the fixing of the second stop onto the treated portion comprising crimping a sleeve or ring onto the treated portion.

20. The method of claim 15, the engaging of the inner bearing with a frame wire comprising fixedly engaging at least a portion of the inner bearing with the first stop to operably mitigate rotation of the inner bearing with respect to the frame wire.

* * * * *